United States Patent
Christensen

(10) Patent No.: US 8,087,510 B2
(45) Date of Patent: Jan. 3, 2012

(54) SORTING CONVEYOR SYSTEM

(75) Inventor: Torben Christensen, Arden (DK)

(73) Assignee: Univeyor A/S, Arden (DK)

( * ) Notice: Subject to any disclaimer, the term of this patent is extended or adjusted under 35 U.S.C. 154(b) by 394 days.

(21) Appl. No.: 12/302,063

(22) PCT Filed: May 15, 2007

(86) PCT No.: PCT/DK2007/000231
§ 371 (c)(1),
(2), (4) Date: Nov. 24, 2008

(87) PCT Pub. No.: WO2007/134602
PCT Pub. Date: Nov. 29, 2007

(65) Prior Publication Data
US 2009/0139835 A1    Jun. 4, 2009

(30) Foreign Application Priority Data
May 24, 2006    (DK) .................................. 2006 00714

(51) Int. Cl.
B65G 47/46    (2006.01)
B65G 47/64    (2006.01)

(52) U.S. Cl. ................... 198/587; 198/369.1; 198/369.5

(58) Field of Classification Search ............... 198/369.1, 198/369.5, 370.06, 436, 575, 587
See application file for complete search history.

(56) References Cited

U.S. PATENT DOCUMENTS

| | | | | |
|---|---|---|---|---|
| 1,741,616 A * | 12/1929 | Crady | ............................. | 193/36 |
| 2,232,081 A * | 2/1941 | Sloane | .......................... | 198/587 |
| 2,234,384 A * | 3/1941 | Ryan | ............................. | 475/172 |
| 2,310,160 A * | 2/1943 | Cohen | ......................... | 198/369.5 |
| 3,827,585 A * | 8/1974 | McWilliams | ................. | 414/398 |
| 3,982,625 A * | 9/1976 | Wentz et al. | .................. | 198/572 |
| 4,368,984 A * | 1/1983 | Rikker | ............................ | 366/15 |
| 4,387,798 A * | 6/1983 | Jamison et al. | ............... | 198/587 |
| 5,188,210 A * | 2/1993 | Malow | ........................ | 198/369.5 |
| 5,191,963 A * | 3/1993 | Delsanto | ........................ | 198/429 |
| 5,613,590 A * | 3/1997 | Simionato | ..................... | 198/358 |
| 5,772,000 A * | 6/1998 | Serres | ......................... | 198/369.5 |
| 5,787,941 A * | 8/1998 | Nakagawa | ..................... | 141/129 |
| 5,893,262 A * | 4/1999 | Harbach | ......................... | 56/208 |
| 6,032,781 A * | 3/2000 | Ballestrazzi et al. | ...... | 198/369.4 |
| 6,220,427 B1 * | 4/2001 | Ratz et al. | .................. | 198/861.2 |
| 6,227,377 B1 * | 5/2001 | Bonnet | ......................... | 209/650 |
| 7,137,506 B2 * | 11/2006 | Munoz-Guerra et al. | . | 198/860.2 |
| 7,138,596 B2 * | 11/2006 | Pippin et al. | .................. | 209/584 |

(Continued)

FOREIGN PATENT DOCUMENTS

CA    2 541 129    1/2004

(Continued)

*Primary Examiner* — Douglas Hess
(74) *Attorney, Agent, or Firm* — Antonelli, Terry, Stout & Kraus, LLP.

(57) ABSTRACT

A conveyor system for sorting items that are supplied in a random sequence via a conveyor including a plurality of conveyor sections 4, and including individual sorting means arranged in a row for directing the items to specific receiving positions at least one side of the sorting means. The sorting means are constituted by relatively short individually driven belt conveyor sections which are pivotably suspended on mainly vertical turning shafts (8), and which at a foremost end part (5) project in over a next belt conveyor section (4) in the row. By means of simple technical measures it is possible to counteract the drawbacks of corresponding prior art conveyor systems and to achieve further advantages that are very essential and new.

20 Claims, 4 Drawing Sheets

U.S. PATENT DOCUMENTS

| | | |
|---|---|---|
| 7,156,237 B2 * | 1/2007 | Nakabayashi et al. ......... 209/551 |
| 7,185,754 B2 * | 3/2007 | Taylor et al. .............. 198/750.14 |
| 7,267,518 B2 * | 9/2007 | Kinzer ........................... 414/272 |
| 7,318,722 B2 * | 1/2008 | Drysdale ........................ 425/534 |
| 7,404,478 B2 * | 7/2008 | Weber ...................... 198/457.03 |
| 7,547,174 B1 * | 6/2009 | Pippin et al. ................... 414/280 |
| 2004/0159246 A1 | 8/2004 | Weber |
| 2005/0032940 A1 | 2/2005 | Muramatsu et al. |

FOREIGN PATENT DOCUMENTS

| | | |
|---|---|---|
| DE | 195 39 328 A1 | 4/1997 |
| FR | 2 104 687 | 7/1970 |
| JP | 61-211217 | 9/1986 |
| JP | 2004-35241 | 2/2004 |
| WO | WO 97/15405 | 5/1997 |
| WO | WO 2005/032940 A1 | 4/2005 |

* cited by examiner

SORTING CONVEYOR SYSTEM

CROSS REFERENCE TO RELATED APPLICATION

This application claims the benefit of the filing date of PCT/DK2007/000231, filed May 15, 2007, which application is incorporated herein by reference in its entirety.

BACKGROUND OF THE INVENTION

1. Field of the Invention

The present invention concerns a conveyor system for sorting items.

2. Description of the Prior Art

With prior art conveyor systems for sorting items, there is used relatively complicated and very costly mechanical constructions in the receiving positions directing items laterally out to predetermined receiving positions at both sides of the conveyor system, that is in the shape of mechanisms for tilting a conveyor section opposite the receiving station, or in the form of mechanical arms that may be turned over the conveyor system for moving a predetermined item out to a desired receiving position.

From postal sorting systems, it is furthermore known with so-called tip conveyors, where respective conveyor sections are adapted to tilt opposite a predetermined receiving position with the intention of moving a predetermined item out in the receiving position. Also, here the mechanical constructions are relatively complicated and very costly mechanical constructions.

SUMMARY OF THE INVENTION

The invention is a new and improved conveyor system of the kind described above, and which by the use of simple technical measures enables counteracting the drawbacks of the prior art conveyor systems, and furthermore achieves essential and new application advantages.

The conveyor system according to the invention utilizes a sorting system constituted by relatively short individually driven belt conveyor sections which are pivotably suspended on mainly vertical turning shafts, and which at a foremost end part project in over the next belt conveyor section in the row. By means of simple technical measures it hereby becomes possible to counteract the drawbacks of prior art conveyor systems and furthermore to achieve advantages that are very essential and new.

It is to be particularly emphasized that the conveyor system according to the invention can be used almost universally for sorting out very different items, which may vary both in size and in weight with great speed and capacity, that is from box packings of up to 30 kg to very light plastic bags with a content in the form of, for example, a few electric fuses.

The conveyor system according to the invention is designed so that at the foremost end part, the pivotable belt conveyor sections have as low a height as a foremost reversing roller has small diameter.

The conveyor system according to the invention is furthermore preferably has at the foremost end part and at some distance to the rear, the pivotable belt conveyor has as low a height as a foremost reversing roller and a reversing roller disposed at some distance to the rear of the foremost roller having the small diameter.

With the purpose of achieving optimal operation of the conveyor system according to the invention, it is particularly advantageous that the mainly vertical turning shaft for the pivotable belt conveyor is disposed at a rearmost end of the belt conveyor section, and is provided with a pivot control mechanism, preferably extending rearwards, and which is adapted to interact with a control arm connected to a pivot motor.

The conveyor system according to the invention is furthermore designed so that the pivot control mechanism has mutually parallel, downwards open guide sections that are interspaced and adapted for receiving guide rollers of the control arm, and with the spacing between the guide rollers on the control arm is the same as the spacing between the guide sections.

With regard to control, the conveyor system according to the invention has engagement between the guide rollers of the control arm and the guide sections arranged so that the guide rollers engage both guide sections when the control arm is transversely disposed in relation to a longitudinal center axis of the pivotable belt conveyor sections, corresponding to the pivotable belt member is not turned outwards.

With the objective of delivering items to a receiving position to the left side, the conveyor system according to the invention is designed so that the engagement between the guide rollers of the control arm and the guide sections is such that a left one of the guide rollers engages a left one of the guide sections when the control arm is turned clockwise, corresponding to the pivotable belt conveyor being turned outwards about 45° to the left side in relation to a longitudinal center axis.

With the objective of delivering items to a receiving position to the left side, the conveyor system according to the invention is designed so that the engagement between the guide rollers of the control arm and the guide sections is arranged so that a right one of the guide rollers engages a right one of the guide sections when the control arm is turned counterclockwise, corresponding to the pivotable belt conveyor being turned outwards about 45° to the right side in relation to a longitudinal center axis.

In a particularly simple way, the conveyor system according to the invention uses a pivot control mechanism including position control means in the form of induction sensors that are adjustably mounted in curving slots, and which interact with plate-shaped position guide members.

The conveyor system according to the invention preferably uses belt conveyors each including an electric drive motor which accelerates the belt conveyor at least when turned laterally outwards in relation to a longitudinal center axis with the purpose of moving items out to a receiving position.

DESCRIPTION OF THE DRAWINGS

The invention is now explained more closely in connection with the drawing, in which.

DETAILED DESCRIPTION OF THE INVENTION

Figure 1:
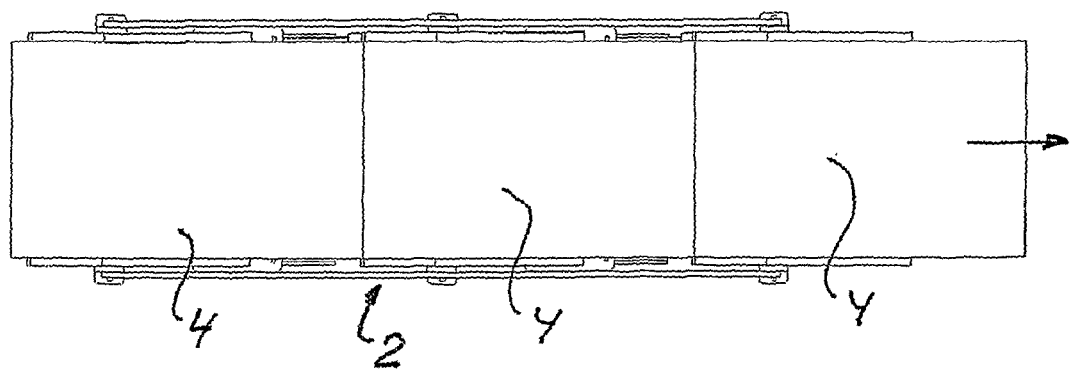
FIG. 1 shows a plan view of an embodiment of a sorting member of a conveyor system according to the invention, as seen from above.
Figure 2:
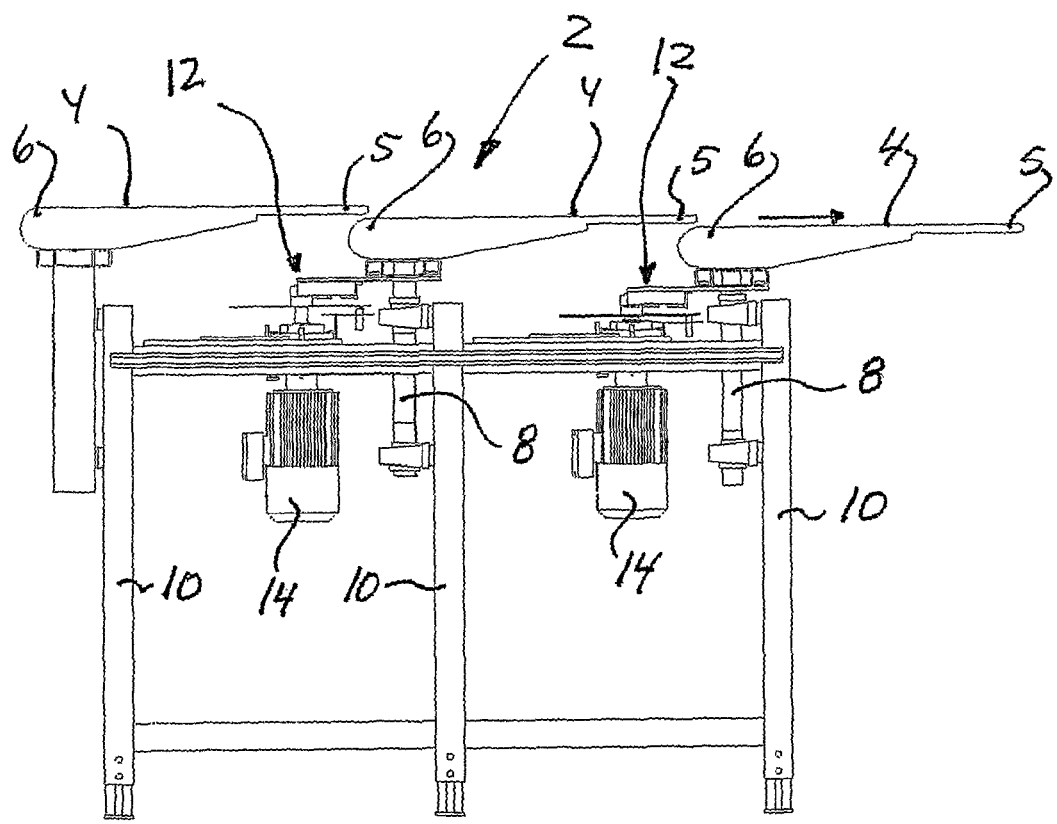
FIG. 2 shows the sorting member of a conveyor system according to the invention shown in FIG. 1 as seen from the side.
Figure 3:
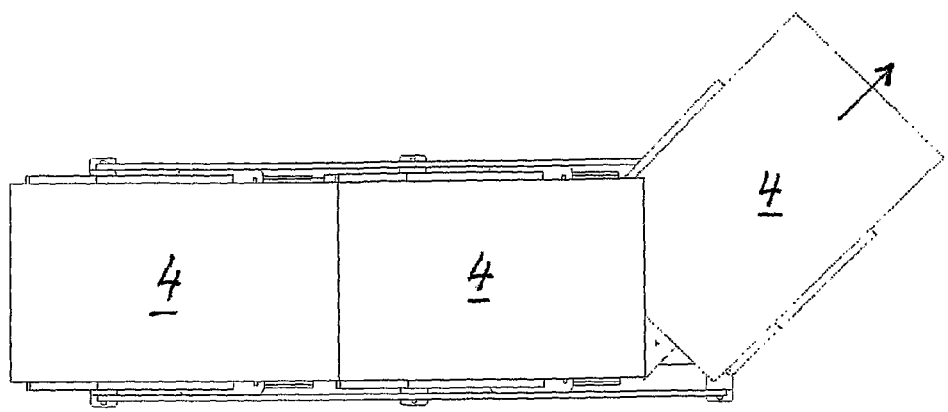
FIG. 3 shows the sorting member of a conveyor system according to the invention as shown in FIG. 1, as seen from above and with a foremost belt conveyor turned out to the left in relation to a central longitudinal axis.
Figure 4:
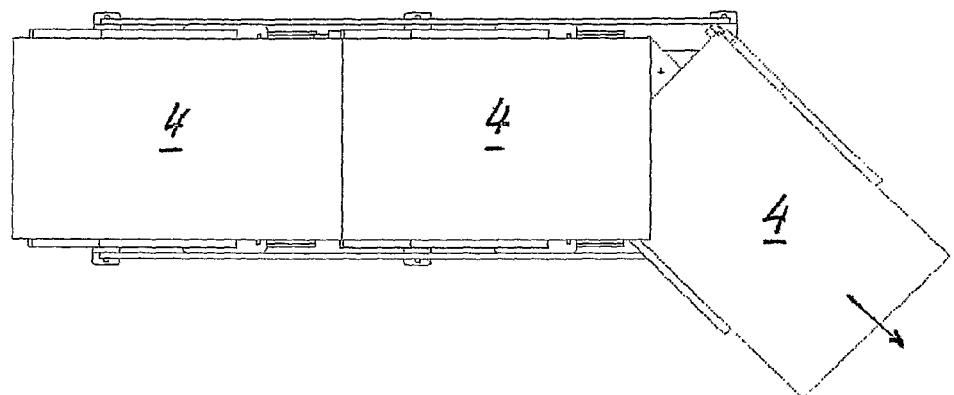
FIG. 4 shows the sorting member of a conveyor system according to the invention as shown in FIG. 1, as seen from above and with a foremost belt conveyor turned out to the right in relation to a central longitudinal axis.
Figure 5:
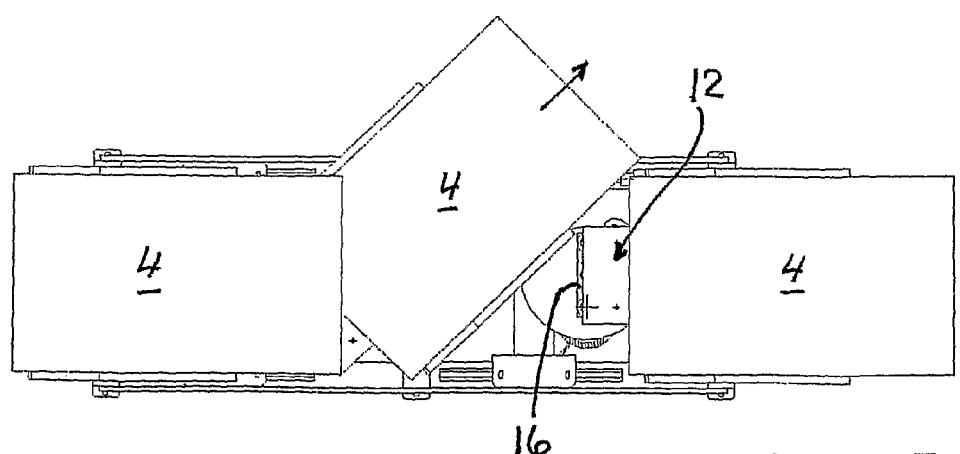
FIG. 5 shows the sorting member of a conveyor system according to the invention as shown in FIG. 1, as seen from above and with an middle belt conveyor turned out to the left in relation to a central longitudinal axis.

The sorting member 2 shown in FIGS. 1-6 for a conveyor system according to the invention is a conveyor system including for example three relatively short belt conveyor sections 4, which, as shown in FIG. 2, are designed with a foremost reversing roller with small diameter so that a foremost end part 5 has very little height or thickness. Thereby the foremost end part 5 of a belt conveyor section 4 is allowed to project in over a rearmost end part 6 of the next belt conveyor section 4 in the row. The sorting member 2 may of course have a much larger number of the belt conveyor sections 4, corresponding to the desired number of receiving positions, as each belt conveyor section 4 can serve a right and a left receiving position.

At a rearmost end part 6, each of the belt conveyor sections 4 are pivotably suspended on a strong vertical turning shaft 8 which is mounted at the side of strong vertical frame parts 10. At the rear, the belt conveyor sections 4 are provided with a pivot control mechanism 12 which is operated by electric gear motors 14. The pivot control mechanism 12 includes a control arm 16 which is rotationally rigidly connected to the gear motor 14, and which at opposite ends has upright journals 18 for guide rollers 20.

Figure 7:
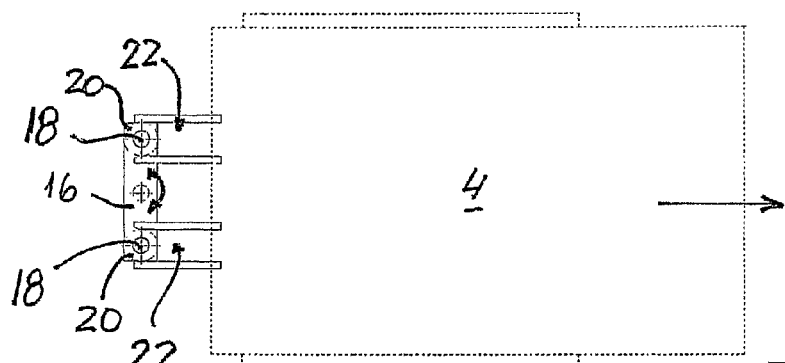
FIG. 7 shows the mutual position and engagement of individual parts of the pivot control mechanism when the belt conveyor is not turned outwards in relation to a central longitudinal axis.
Figure 8:
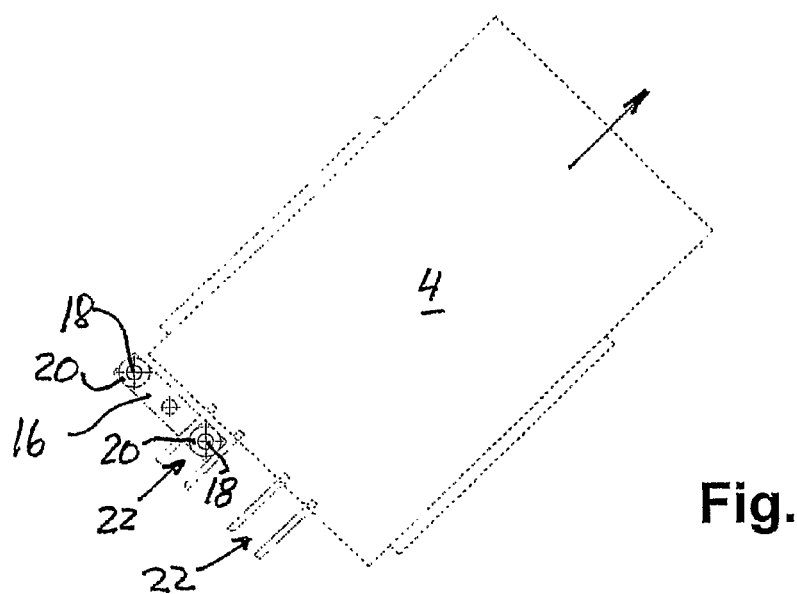
FIG. 8 shows the mutual position and engagement of individual parts of the pivot control mechanism when the belt conveyor is turned out to the left in relation to a central longitudinal axis.
Figure 9:
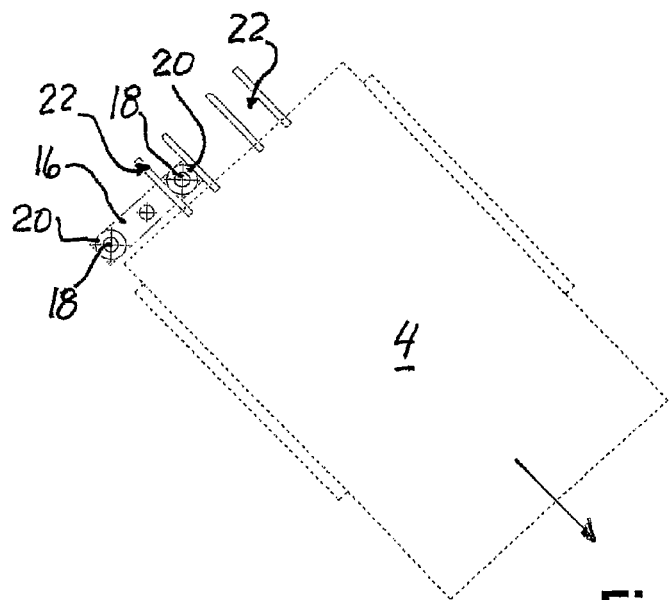
FIG. 9 shows the mutual position and engagement of individual parts of a pivot control mechanism when the belt conveyor is turned out to the right in relation to a central longitudinal axis.

As most clearly illustrated in FIGS. 7-9, the guide rollers 20 are adapted to interact or engage with downwards open guide sections 22, which as a part of the pivot control mechanism 12 project to the rear centrally from the belt conveyor section 4, and which are disposed in parallel and with spacing corresponding to the spacing between the guide rollers 20 on the said control arm 16.

Figure 6:
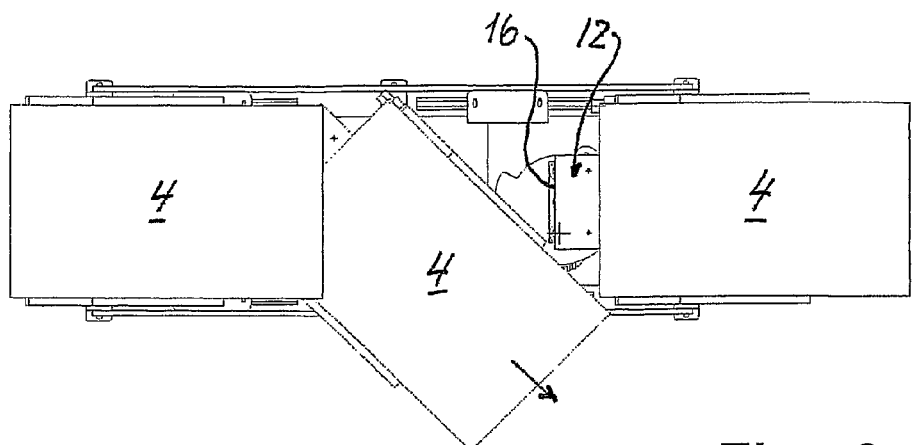
FIG. 6 shows the sorting member of a conveyor system according to the invention as shown in FIG. 1, as seen from above and with an middle belt conveyor turned out to the right in relation to a central longitudinal axis.

When a belt conveyor section 4 is not turned out with the object of sorting out items, that is when the belt conveyor section 4 assumes a position as rearmost or foremost in FIG. 6, the control arm 16 assumes a transverse position, as shown in FIG. 7, where both guide rollers 20 engage both guide sections 22.

With the intention of turning the belt conveyor section 4 to the left side relative to a central longitudinal axis, the control arm is turned clockwise to the position shown in FIG. 8, where a guide roller 20 engages the bottom of left guide section 22, while the control arm 16 is disposed externally to the left side along the back side of the belt conveyor section 4, that is, the control arm is turned to the left with the object of sorting out items to a given receiving position at the left side of the conveyor system according to the invention.

With the intention of turning the belt conveyor section 4 to the right side relative to a central longitudinal axis, the control arm 16 is turned counterclockwise to the position shown in FIG. 9, where a guide roller 20 engages the bottom of right guide section 22, while the control arm 16 is disposed externally to the right side along the back side of the belt conveyor section 4, that is, the control arm is turned to the right with the object of sorting out items to a given receiving position at the right side of the conveyor system according to the invention.

Figure 10:
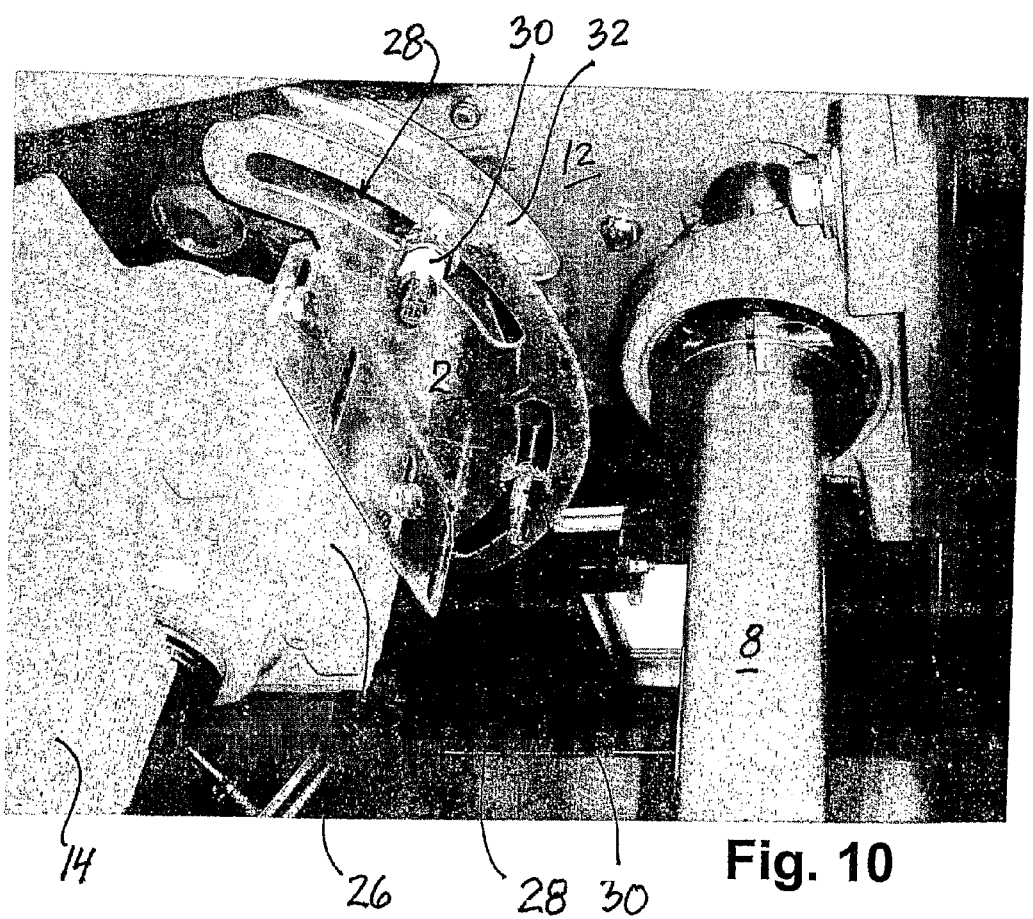
FIG. 10 shows a detailed view of the individual parts of an embodiment of a pivot control mechanism for a conveyor system according to the invention.

In FIG. 10 appears some details of the pivot control mechanism 12 in the form of a plate-shaped fitting 24 which is fastened externally of a gear box 26 for the gear motor 14, and which is designed with two curving slots 28 in which two induction sensors 30 are mounted. With the object of positioning the turning movement of the belt conveyor section 4, the sensors 30 interact with at least one upper curving plate 32 in such a way that termination of the plate 32 or cutouts at the edge of it can be read by the induction sensors 30.

For example, the conveying speed of the belt conveyor sections 4 may be of the magnitude 1 m/s, but it would be possible, especially when the belt conveyor sections 4 are turned out at one side with the object of sorting out items, to accelerate the belt conveyor 4 with the object of increasing the sorting capacity of the conveyor system.

The invention claimed is:

1. A conveyor system for sorting items supplied in random sequence comprising:
a conveyor for directing the items through a plurality of pivotable conveyor sections, a plurality of the pivotable conveyor sections each including means for sorting and arranged in a row for directing the items from moving along the pivotable conveyor section to a receiving position at least one side of each of the means for sorting of the pivotable conveyor sections; and wherein the means for sorting are pivotably suspended on vertical turning shafts and an end part of a plurality of pivotable conveyor sections projects over a next conveyor section along the conveyor.

2. A conveyor system according to claim 1, wherein a plurality of pivotable sections at an end part thereof each has a height determined by a diameter of a reversing roller at the end part.

3. A conveyor system according to claim 2, wherein each of the pivotable conveyor sections includes an electric drive motor which accelerates the pivotable conveyor section at least when turned laterally outwards in relation to a longitudinal center axis for moving the items out to the receiving position.

4. A conveyor system according to claim 1, wherein the vertical turning shaft of a plurality of pivotable conveyor sections each is disposed at an end of the conveyor section and is provided with a pivot control mechanism which extends rearwardly and which interacts with a control arm connected to a pivot motor.

5. A conveyor system according to claim 4, wherein the pivot control mechanism includes parallel spaced apart guides for receiving guide rollers of the control arm and wherein the spacing between the guide rollers is the same as spacing between the guides.

6. A conveyor system according to claim 5, wherein the guide rollers each engage the guide sections when the control arm is transversely disposed in relation to a longitudinal dimension of each of a plurality of the pivotable conveyor sections when each pivotable conveyor section is not turned outwards.

7. A conveyor system according to claim 6, wherein the engagement between the guide rollers of the control arm and the guides is such that a left one of the guide rollers engages a left one of the guides when the control arm is turned, corresponding to the pivotable conveyor sections are turned outwards to a left side in relation to the longitudinal dimension.

8. A conveyor system according to claim 7, wherein the engagement between the guide rollers of the control arm and the guides is such that a right one of the guide rollers engages a right one of the guides when the control arm is turned, corresponding to the pivotable conveyor sections turned outwards to a right side in relation to the longitudinal dimension.

9. A conveyor system according to claim 8, wherein the pivot control mechanism includes a position control including sensors mounted in slots, and which interact with position guide members.

10. A conveyor system according to claim 4, wherein the pivot control mechanism includes sensors mounted in slots which interact with position guide members to control pivoting of the plurality of pivotable conveyor sections.

11. A conveyor system according to claim 4, wherein each of the pivotable conveyor sections includes an electric drive motor which accelerates the pivotable conveyor section at least when turned laterally outwards in relation to a longitudinal center axis for moving the items out to the receiving position.

12. A conveyor system according to claim 5, wherein the pivot control mechanism includes a position control including sensors mounted in slots, and which interact with position guide members to control pivoting of the plurality of conveyor sections.

13. A conveyor system according to claim 5, wherein each of the pivotable conveyor sections includes an electric drive motor which accelerates the pivotable conveyor section at least when turned laterally outwards in relation to a longitudinal center axis for moving the items out to the receiving position.

14. A conveyor system according to claim 6, wherein the engagement between the guide rollers of the control arm and the guides is such that a right one of the guide rollers engages a right one of the guides when the control arm is turned, corresponding to the pivotable conveyor sections are turned outwards to a right side in relation to the longitudinal dimension.

15. A conveyor system according to claim 14, wherein the pivot control mechanism includes a position control including sensors mounted in slots, and which interact with position guide members.

16. A conveyor system according to claim 6, wherein the pivot control mechanism includes a position control including sensors mounted in slots which interact with position guide members to control pivoting of the plurality of conveyor sections.

17. A conveyor system according to claim 6, wherein each of the pivotable conveyor sections includes an electric drive motor which accelerates the pivotable conveyor section at least when turned laterally outwards in relation to a longitudinal center axis for moving the items out to the receiving position.

18. A conveyor system according to claim 7, wherein the pivot control mechanism includes a position control including sensors mounted in slots, and which interact with position guide members.

19. A conveyor system according to claim 1, wherein a plurality of the pivotable conveyor sections include a pivot control mechanism including sensors mounted in slots which interact with position guide members to control pivoting of the plurality of pivotable conveyor sections.

20. A conveyor system according to claim 1, wherein a plurality of the conveyor sections include an electric drive motor which accelerates the pivotable conveyor sections at least when turned laterally outwards in relation to a longitudinal dimension of the conveyor section for moving the items out to the receiving position.

* * * * *